United States Patent [19]

Fujiwara et al.

[11] Patent Number: 4,779,818

[45] Date of Patent: Oct. 25, 1988

[54] TAPE-LIKE ELEMENT LOADING DEVICE

[75] Inventors: Jiro Fujiwara; Yoshiaki Sugiyama; Hisayoshi Chino, all of Kanagawa, Japan

[73] Assignee: Sony Corporation, Tokyo, Japan

[21] Appl. No.: 141,220

[22] Filed: Jan. 6, 1988

[30] Foreign Application Priority Data

Jan. 17, 1987 [JP] Japan .................................. 62-8751
Jan. 17, 1987 [JP] Japan .................................. 62-8752

[51] Int. Cl.4 ............................................. G11B 15/32
[52] U.S. Cl. ..................................... 242/195; 242/57
[58] Field of Search ........................ 242/195, 186, 57; 360/71, 90

[56] References Cited

U.S. PATENT DOCUMENTS

| 4,243,186 | 1/1981 | Peter et al. ........................... 242/195 |
| 4,520,970 | 6/1985 | Rasmussen et al. ................. 242/195 |
| 4,620,678 | 11/1986 | Kumakura et al. ................. 242/195 |
| 4,726,542 | 2/1988 | Nakayama et al. ............... 242/57 X |

Primary Examiner—David Werner
Attorney, Agent, or Firm—Lewis H. Eslinger

[57] ABSTRACT

In a device for loading a tape-like element, such as, a magnetic tape, film or the like, from supply reel to take-up reel, a tape path for the tape-like element is formed from the vicinity of the supply reel to the vicinity of the take-up reel, a rotation detector is connected with the supply reel to detect the rotation of a predetermined angle in the supply reel and generates a control signal therefrom, and a blower is provided to introduce air under pressure into the tape path for conveying the tape-like element along the tape path in response to the control signal.

6 Claims, 5 Drawing Sheets

TAPE-LIKE ELEMENT LOADING DEVICE

BACKGROUND OF THE INVENTION

1. Field of the Invention

This invention relates generally to a device for loading a tape-like element, such as, a magnetic tape, film or the like, about a guide drum between supply and take-up reels, and more particularly is directed to a tape loading device suited for use in an open reel tape recording and/or reproducing apparatus.

2. Description of the Prior Art

It is already known to provide a tape recording and/or reproducing apparatus with a loading device by which a tape or similar element is automatically conveyed by air under pressure through a predetermined tape path extending from a supply reel to a take-up reel. For example, in U.S. Pat. Nos. 3,127,120, 3,134,527 and 4,243,186, tape loading devices are disclosed which include a duct defining a tape path between a supply reel and a tape-up reel, with an end portion of the tape-like element being conveyed through the duct by a flow of air through the latter in the direction toward the take-up reel. However, in such a loading device, a blower which generates the flow of air is actuated by manually operating a mechanical switch. With the device being thus constructed, it is very difficult to take switable timing when the switch makes ON. For example, in case that the timing is too late, the magnetic tape may be possibly entangled in the duct.

OBJECTS AND SUMMARY OF THE INVENTION

Accordingly, it is an object of the present invention to provide a loading device for loading a tape-like element in an apparatus having supply and take-up reels, and which avoids the above mentioned disadvantages of the tape loading devices according to the prior art.

More specifically, it is an object of this invention to provide a loading device for a tape-like element in an apparatus having supply and take-up reels, and in which the transporting of the tape-like element from the supply reel to the take-up reel during a loading operation is effected by air under pressure which is provided by a blower, thereby to permit reduction of the consumption of electric power by the blower.

It is another object of this invention to provide a loading device, as aforesaid, in which the conveying of the tape-like element from the supply reel to the take-up reel is reliably affected by a flow of air under pressure from a blower which is automatically controlled by detecting initiation and completion of the tape loading.

In accordance with an aspect of this invention, a loading device for loading a tape-like element from the supply reel to the take-up reel, comprises means for defining a tape path from the vicinity of the supply reel to the vicinity of the take-up reel to transport the tape-like element therein, means for detecting a rotation of the supply reel, the detecting means generating a control signal when the supply reel rotates by a predetermined angle, blower means for supplying air under pressure into the tape path so that the tape-like element paid out from the supply reel is conveyed by air under pressure within the tape path, and means connected with the detecting means and the blower means for controlling the blower means so as to initiate the operation of the blower means in response to the control signal.

The above, and other objects, features and advantages of this invention, will be apparent from the following detailed description of an illustrative embodiment when read in connection with the accompanying drawings, in which the same reference numerals are employed for identifying corresponding parts in the several views.

DETAILED DESCRIPTION OF A PREFERRED EMBODIMENT

Figure 1:
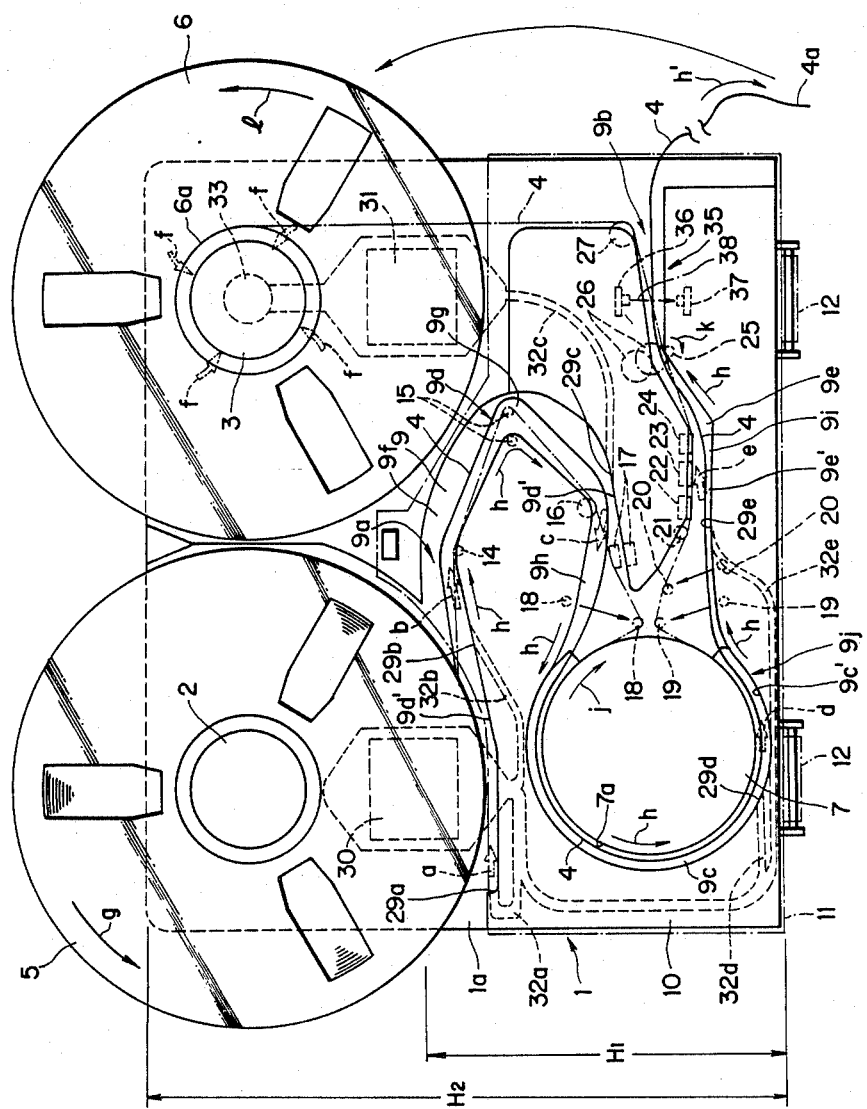
FIG. 1 is a front elevational view of a loading device which is shown incorporated in a helical-scan video tape recorder of the open-reel type.
Figure 2:
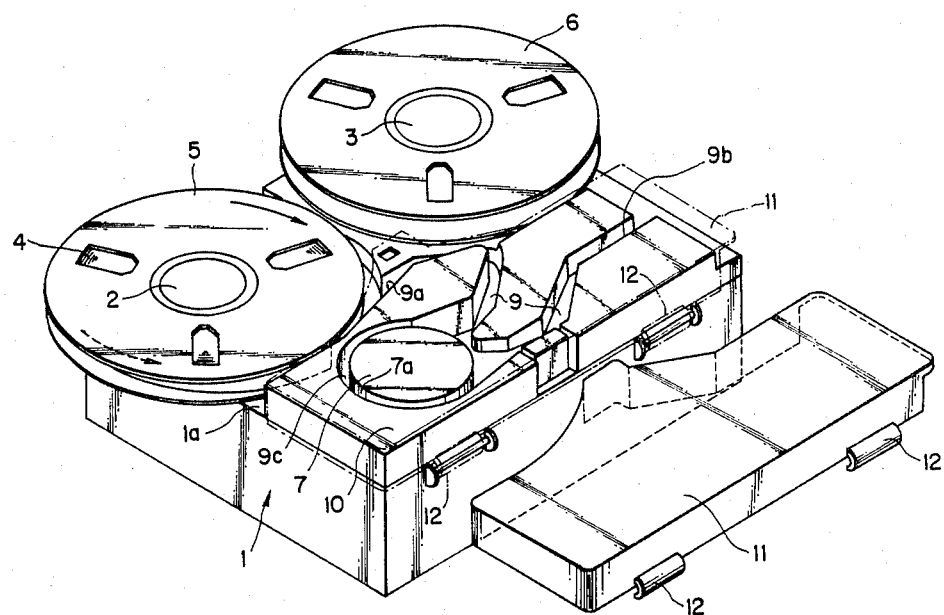
FIG. 2 is a perspective view of the video tape recorder of FIG. 1, but shown laid down on the back surface of its casing.

Referring initially to FIGS. 1 and 2, it will be said that a helical-scan video tape recorder (VTR) of the open-reel type which is adapted to be provided with a loading device according to an embodiment of this invention generally includes a main body or casing 1 which is normally vertically positioned, as shown on FIG. 1, and which has a rotary supply reel base 2 and a rotary take-up reel base 3 directed forwardly from the upper left and right corner portions of a front surface 1a of the body 1 respectively. A supply of magnetic tape 4 is wound around an open supply reel 5 which is removably mounted on, and rotatable with the supply reel base 2. An open take-up reel 6 for taking up the magnetic tape 4 is similarly mounted on, and rotatable with the take-up reel base 3. A rotary head guide drum 7 extends from the front surface 1a of the VTR main body 1 at a position under the supply reel 5, and a tape path 9 having generally zig-zag configuration is formed at the front of the body 1 below the reels 5 and 6.

The tape path 9 has an inlet 9a near the supply reel 5 and an outlet 9b spaced downwardly from the take-up reel 6 at the same side of the main body 1 as the take-up reel. The tape path 9 is shown to include a peripheral path portion 9c extending around at least a part of the periphery 7a of the guide drum 7, a supply side path portion 9d extending from the inlet 9a to the peripheral path portion 9c, and a take-up side path portion 9e extending from the peripheral path portion 9c to the outlet 9b. The supply side path portion 9d is shown to include a first substantially horizontal path section 9f which extends from the inlet 9a to a first turning path section 9g, and a second substantially horizontal path section 9h extending from the first turning path section 9g to the peripheral path portion 9c adjacent the upper portion of the guide drum 7. The peripheral path portion 9c forms a second turning path section, and the take-up side path portion 9e includes a third substantially horizontal path section 9i which extends from the second turning path section to the outlet 9b of the path 9. It will be appreciated from the forgoing that path 9 has an approximately Z-shaped gently curving configuration which efficiently occupies the space in front of the main body 1 under the supply and take-up reels 5 and 6.

The tape path 9 is definded, at the back thereof, by the front surface 1a of the main body 1 of the VTR, and by a front panel 10 suitably secured on the body 1 and having wall sections directed rearwardly to front surface 1a for defining the tape path 9 therebetween. It will appreciated that the tape path 9, as thus defined, has an opening along its front side, and through which access may be had to the tape 4 in the path 9. Further, as shown in FIG. 2 a front cover 11 preferably made of a transparent synthetic resin or the like is pivotally mounted on the main body 1 by hinges 12 so as to be moveable to and from a closed position, indicated in dot-dash lines in FIG. 2, in which the cover 11 substantially envelopes the front panel 10 and closes the opening along the front side of the tape path 9. A suitable locking device (not shown) is desirably provided for securing the cover 11 in its closed position. So that the magnetic tape 4 is wrapped helically around the peripheral surface 7a of the guide drum 7, the take-up reel 6 is offset forwardly relative to the supply reel 5, as is apparent in FIG. 2, and the tape path 9 is suitably tilted so that the inlet 9a thereof is aligned with the plane of rotation of the supply reel 5 and the outlet 9b of the tape path is aligned with the plane of rotation of the take-up reel 6.

Referring again to FIG. 1, it will be seen that a guide post 14, a tension detector 15, a guide roller 16, a full-width erasing head 17 and an entrance guide 18 are arranged in sequence at spaced apart locations along the supply side path portion 9d of the tape path. An exit guide 19, a tape guide 20, an impedance roller 21, an audio erasing head 22, an audio recording and/or reproducing head 23, an audio monitoring head 24, a capstan 25 and an associated pinch roller 26, and a guide roller 27 are arranged in succession at spaced apart locations along the take-up side path portion 9e of the tape path.

A plurality of air outlets 29a, 29b, 29d and 29e open into the tape path 9 at spaced apart locations along the latter and are connected to a blower 30 through air conducting conduits 32a, 32b, 32d and 32e, respectively. An additional air outlet 29c also opens into the tape path 9, and is connected to another blower 31 through a conduit 32c. Moreover, the blower 31 has an inlet 33 connected to a number of suction ports (not shown) opening at the peripheral surface of a hub 6a of the take-up reel 6 so that, when the blower 31 is operating, suction forces indicated by the arrows f in FIG. 1, are available for causing a leading end portion of the tape 4 to adhere to the hub-surface 6a for winding onto the take-up reel.

A photo sensor 35 is provided near the outlet 9b of the tape path 9 and may include a light-emitting element 36 at one side of the path 9 and a light-receiving element 37 at the opposite side of the tape path. The element 37 is positioned to receive light 38 from the emitting element 36 except when tape 4 is present between elements 36 and 37 for intercepting or blocking the light 38.

The operation of the loading device in loading the magnetic tape from the supply reel 5 through the tape path 9 about the guide drum 7 and from the outlet 9b of the tape path to the take-up reel 6 will be described below.

As shown in FIG. 1, when the blowers 30 and 31 are operated, air under pressure is directed from the air outlets 29a to 29e into the tape path 9 in the directions indicated by the arrows a to e, respectively. Further, as already noted, and as indicated by the arrows f, air flows are directed inwardly through the suction ports in the peripheral surface of the hub 6a of the take-up reel 6.

Initially, a leading end portion 4a of the magnetic tape 4 wound on the supply reel 5 is brought to the inlet 9a of the tape path 9, and the supply reel 5 is manually or automatically turned in the direction of the arrow g so as to pay out the magnetic tape 4 therefrom. Due to the air under pressure being supplied to the tape path 9 in the directions of the arrows a to e, the magnetic tape 4 paid out from the supply reel 5 is conveyed in the direction of the arrow h from the inlet 9a, through the supply side path portion 9d, the peripheral path portion 9c and the take-up side path portion 9e, in sequence, to the outlet 9b of the tape path 9. When the leading end portion 4a of the magnetic tape 4 reaches the outlet 9b, such leading end portion 4a interrupts the light 38 emitted from the element 36 toward the light-receiving element 37 so that the photo sensor 35 thereby senses or detects the arrival of the leading end portion 4a of the tape at the outlet 9b.

Figure 3:
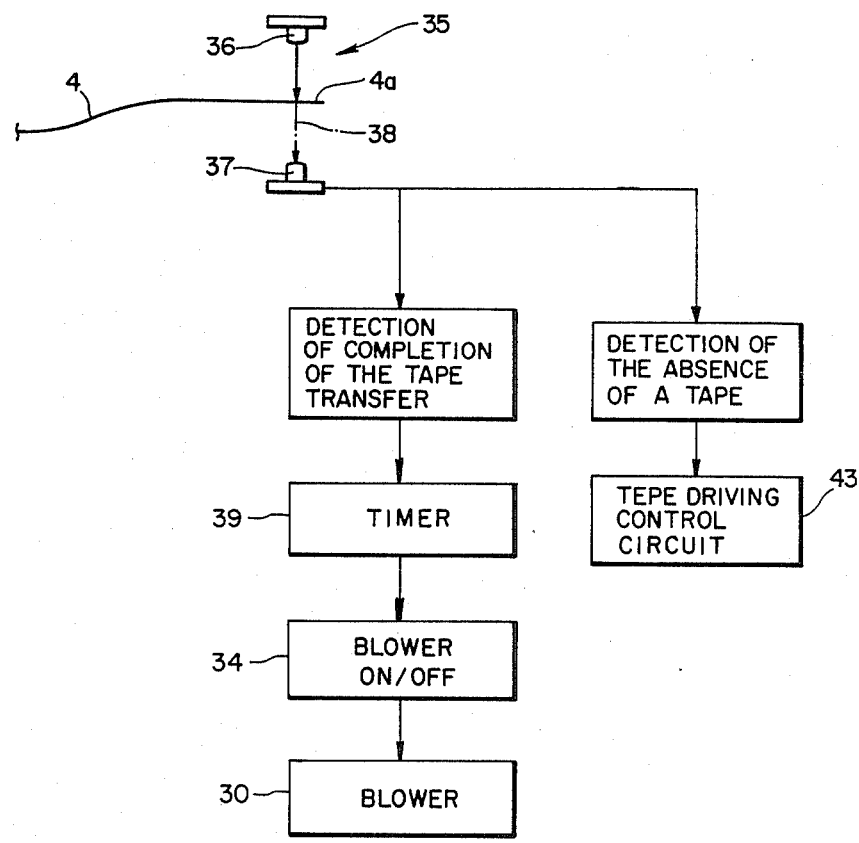
FIG. 3, is a block diagram illustrating a blower control system of the loading device shown on FIG. 1.

When the photo sensor 35 detects the arrival of the leading end portion 4a of the tape at the outlet 9b, that is, detects the completion of the tape transfer, the operation of a timer 39 is thereby initiated, as shown in FIG. 3. When the timer 39 has counted the passage of a predetermined time from the initiation of its operation, a blower ON/Off circuit 34 is actuated to halt the operation of the blower 30. It will be appreciated that, during the predetermined time set by the timer 39, which may be further extended by, or may include the short periode in which the blower 30, due to inertia, continues to pump air after the energizing of its motor has been interrupted by the circuit 34, the supplying of air under pressure from the outlets 29a to 29e into the tape path 9 causes continued transport of the tape so that its leading end portion 4a finally extends a predetermined distance from the outlet 9b, as indicated at h'. When the operation of the blower 30 is halted, the supplying of the air under pressure to the tape path 9 through the air outlets 29a, 29b, 29d and 29e is stopped so that the magnetic tape 4 is not further conveyed along the path 9. The manual or automatic rotation of the supply reel 5 during the transport of the tape through the path 9 by air under pressure admitted at air outlets 29a to 29e is halted at the time when the operation of the blower 30 is halted.

The leading end portion 4a of the magnetic tape projecting out of the outlet 9b of the tape path 9 is then manually picked up and moved in the direction of the arrow i toward the hub 6a of the take-up reel 6. By reason of the air suction forces indicated by the arrows f which result from the continued operation of the blower 31, the leading end portion 4a of the magnetic tape is made to adhere to the surface of the hub 6a and the take-up reel 6 is turned in the direction of the arrow l for initiating the winding of the tape 4 on the hub 6a and taking up the slack in the magnetic tape as indicated by the dot-line in FIG. 1. When the leading end 4a of the tape has thus been firmly attached to the periphery of the hub 6a, the operation of the blower 31 is also halted by detecting rotation of the take-up reel 6 in the same manner as that of the supply reel 2.

Although the leading end portion 4a of the magnetic tape 4 is adhered by suction to the hub 6a of the take-up reel 6 at the initiation of the winding of the tape on the take-up reel in the illustrated embodiment that arrangement is not necessary to the invention. For example, the leading end portion 4a of the magnetic tape may be inserted into one of a number of slits (not shown) formed in the hub 6a, or the leading end portion of the tape may be otherwise secured to the hub 6a.

It will be appreciated that, during the loading operation, the tension detector 15, the full-width erasing head 17, the entrance guide 18, the tape guide 20 and the pinch roller 26 are suitably disposed in respective inactive positions indicated by dotted lines in FIG. 1, in which inactive positions the mentioned elements of the VTR are removed from the tape path 9 so as to avoid interference with the transport of the magnetic tape 4 along such path. Upon the completion of the above described loading operation, that is, after the leading end portion 4a of the magnetic tape 4 has been adhered to the hub 6a of the take-up reel 6 and initial winding of the tape on the hub of reel 6 has been effected, a standby button (not shown) of the VTR is depressed or actuated and, in response thereto, a rotary portion of the guide drum 7 and the rotary heads mounted thereon are suitably rotated in the direction of the arrow j, and the tension detector 15, erasing head 17, entrance guide 18, exit guide 19 and tape guide 20 are moved from their inactive positions to active positions indicated by dot-dash lines in FIG. 1. As a result of the foregoing, the magnetic tape 4 between reels 5 and 6 follows the path indicated in dot-dash lines and is wrapped helically around the periphery 7a of guide drum 7.

When a play button (not shown) of the VTR is depressed, capstan 25 is suitably rotated in the direction of the arrow k in FIG. 1, and the pinch roller 26 is moved to the position shown in dot-dash lines so as to press the tape 4 against the rotated capstan for driving the tape while the supply reel 5 and the take-up reel 6 are rotated in the directions of the arrows g and l, respectively. Therefore, the magnetic tape 4 is driven at a constant speed through the tape path 9 in the direction of the arrow h during a recording or reproducing operation.

If the magnetic tape 4 is inadvertently severed during a recording or reproducing operation, or when the VTR is in its fast-forward or rewinding mode, or if the magnetic tape 4 is completely wound on the take-up reel 6 or the supply reel 5, so that the light-receiving element 37 of the photo sensor 35 again receives light 38 from the element 36, the resulting indication that the magnetic tape 4 is not present in the tape path 9 causes a tape driving control circuit 43 (FIG. 3) to halt the operation of the tape driving system, that is, to halt the rotation of the capstan 25 and of the reels 5 and 6, and also causes rotation of the rotary portion of the guide drum 7 to be halted.

It will be seen that, in the loading device, the peripheral path portion 9c is defined, in part, at the underside of the guide drum 7, by a lower wall section 9c' which faces upwardly in the normal operating position of the VTR. Further, the supply side path portion 9d of the tape path 9 is defined, at least in part, by upwardly facing lower wall sections 9d' along the first substantially horizontal path section 9f extending from the inlet 9a to the first turning path section 9g, and along the second substantially horizontal path section 9h extending from the turning path section 9g to the peripheral path portion 9c. Similarly, the third substantially horizontal path section 9i of the take-up side path portion 9e is defined, in part, by a lower wall section 9e' facing upwardly in the normal operating position. Furthermore, the air outlets 29a, 29b and 29c all open at the upwardly facing lower wall sections 9d' of the supply path portion for directing air under pressure into the path 9 along the respective lower wall sections. Similarly, the air outlets 29d and 29e open at the lower wall sections 9c' and 9e', respectively, of the peripheral and take-up path portions, respectively, for directing under pressure into the path 9 along the respective lower wall sections. By reason of the foregoing, air under pressure supplied from the air outlets 29a to 29e in the directions of the arrows a to e, respectively, form tape supporting air flows or streams along the lower wall sections 9d', 9c' and 9e' on which the magnetic tape 4 is conveyed substantially out of contact with the surfaces of such lower wall sections. Therefore, the magnetic tape 4 may be reliably conveyed from the inlet 9a to the outlet 9b of the path 9 by the blowers 30 and 31 which need not be very powerful.

Figure 4:
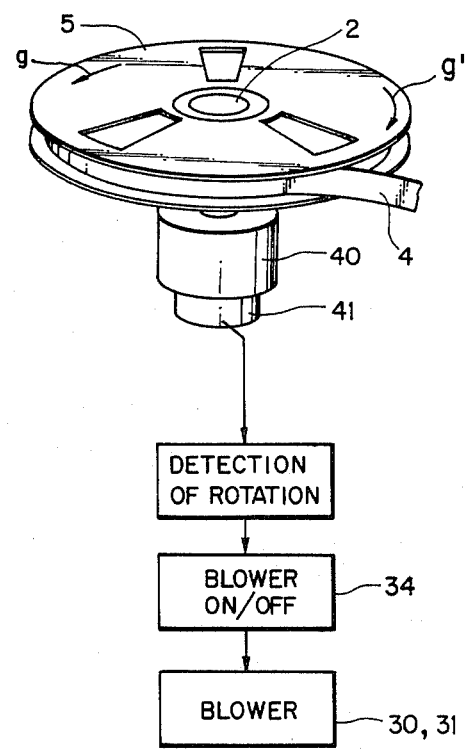
FIG. 4, is a block diagram illustrating a blower control system according to this invention incorporated in the loading device of FIG. 1.

According to this invention, the loading device is provided with a blower control system shown in FIG. 4, in which a rotation of a supply reel motor 40 is detected by a detector 41 connected thereto. For example, when the supply reel 5 is manually rotated by a predetermined angle, such as half cycle, the detector 41 generates an output signal which indicates the rotation of the supply reel base 2. The output signal is supplied to the blower ON/OFF circuit 34 to actuate the blower 30 and 31 thereby.

The rotation of the supply reel 5 in the direction of arrow g brings the leading end portion 4a of the magnetic tape 4 to the inlet 9a of the tape path 9, and simultaneously the rotation thereof is detected by the detector 41 to supply the output signal to the blower ON/OFF circuit 34 in order to make the blowers 30 and 31 ON at the same time. It is noted that the rotation of the supply reel 5 in the direction of arrow g' on FIG. 1 can be also detected in the same manner.

Figure 5:
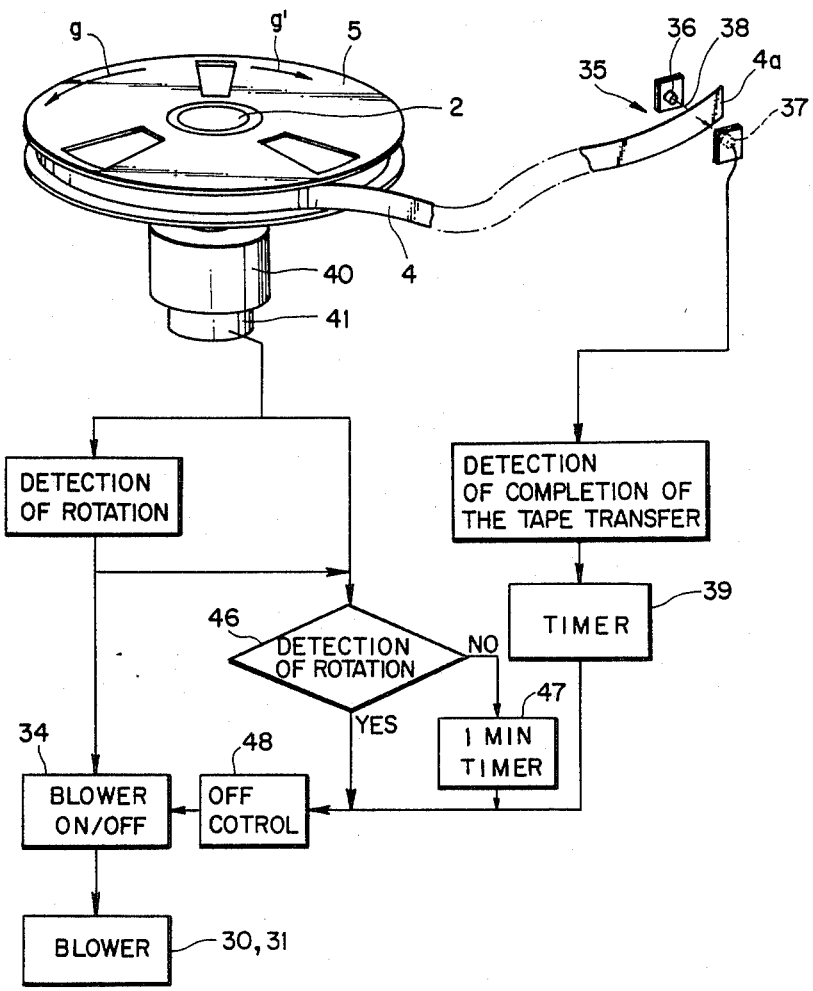
FIG. 5 is a block diagram illustrating another blower control system according to this invention which is incorporated in the loading device of FIG. 1.

FIG. 5 shows another embodiment of the blower control system according to this invention, in which the detection of rotation and the detection of completion of the tape transfer are performed in the same way as described hereinbefore. The blower control system is provided with an additional detector 46 and an additional timer 47. The additional detector 46 is used to detect whether the supply reel 5 is rotated only for a relatively short period, such as three seconds. On the other hand, the timer 47 is used to measure a sufficient interval, such as 1 minute, so that the magnetic tape 4 reaches the photo sensor 35.

Now assuming that the magnetic tape 4 is accidentally stopped up within the tape path 9, the blower control signal 48 is not generated from the timer 39 to actuate the blower ON/OFF circuit 34 to halt the operation of the blowers 30 and 31. However, after passing the preset time of the timer 47, the timer 47 generates the blower control signal 48 to automatically halt the operation of the blowers 30 and 31.

Furthermore, when the loading operation is stopped due to the way that the magnetic tape 4 is being threaded in the tape path, the supply reel 5 is rotated only for short period. This short rotation of the supply reel 5 is detected by the detector 46, and hence the blower control signal 48 is produced therefrom to actuate the blower ON/OFF circuit 34 to halt the operation of the blowers 30 and 31. It is herein noted that even after the magnetic tape 4 reaches to the photo sensor 35, the blowers 30 and 31 can be reactuated by rotating the supply reel 5 again to thereby proceed the loading operation.

Although an illustrative embodiment of this invention has been described above with reference to the accompanying drawings, it is to be understood that the invention is not limited to that precise embodiment, and that various changes and modifications may be effected therein by one skilled in the art without departing from the scope or spirit of invention as defined in the appended claims.

What is claimed is:

1. A loading device for loading a tape-like element from a rotatable supply reel to a rotatable take-up reel, comprising:

means for defining a tape path from the vicinity of said supply reel to the vicinity of said take-up reel so as to transport said tape-like element therein;

means for detecting rotation of said supply reel and generating a control signal when said supply reel rotates by a predetermined angle;

blower means for supplying air under pressure into said tape path so that the tape-like element paid out from said supply reel is conveyed by air under pressure within said tape path; and means connected with said detecting means and said blower means for controlling said blower means so as to initiate the operation of said blower means in response to said control signal.

2. A loading device according to claim 1, wherein said controlling means includes means for detecting a completion of tape transfer along said tape path and generating a corresponding second control signal, said blower means being actuated to halt the operation thereof in response to said second control signal.

3. A loading device according to claim 2, wherein said controlling means further includes first timer means connected with said means for detecting the completion of tape transfer for delaying the generation of said second control signal by a predetermined time preset in said first timer means.

4. A loading device according to claim 3, wherein said tape path includes an outlet, said means for detecting the completion of tape transfer including a photo sensor which is arranged near the outlet of said tape path, said photo sensor comprising a light-emitting element and a light-receiving element arranged so that said tape-like member is transported therebetween.

5. A loading device according to claim 1, wehrein said controlling means includes means for detecting a duration of rotation of said supply reel and halting the operation of said blower means when said duration of rotation is less than a predetermined period.

6. A laoding device according to claim 5, wherein said controlling means further includes second timer means connected with said duration detecting means for halting the operation of said blower means when the rotation of said supply reel continues for more than a predetermined interval.

* * * * *

UNITED STATES PATENT AND TRADEMARK OFFICE
CERTIFICATE OF CORRECTION

PATENT NO. : 4,779,818
DATED : October 25, 1988
INVENTOR(S) : Jiro Fujiwara et al.

It is certified that error appears in the above-identified patent and that said Letters Patent is hereby corrected as shown below:

Column 2, line 38, after "body 1" insert --,--.
Column 4, line 33 and 34, change "periode" to --time period--.
Column 6, line 1, after "supply" insert --side--;
         line 67, after "proceed" insert --with and complete--.

IN THE CLAIMS
Column 8, line 17 change "wehrein" to --wherein--

Signed and Sealed this

Eleventh Day of April, 1989

Attest:

DONALD J. QUIGG

*Attesting Officer*   Commissioner of Patents and Trademarks